Patented Nov. 30, 1943

2,335,760

UNITED STATES PATENT OFFICE 2,335,760

COATING COMPOSITION

Robert Tyler Hucks, South River, N. J., assignor to E. I. du Pont de Nemours & Company, Wilmington, Del., a corporation of Delaware No Drawing. Application July 31, 1941, Serial No. 404,844

7 Claims. (Cl. 106—193)

This invention relates to new and novel coating compositions and more particularly to coating compositions of unusual beauty and transparent color effects.

The customary basic requirements for coloring matter when used in coating compositions involve essentially high hiding power, whereby an opaque appearance is secured, and good durability in order that the coating may withstand deterioration from destructive forces of light and exposure to the elements. Pigments which provide an opaque appearance play a large part in contributing to the general durability of such products. Recently there has been a trend toward the so-called "transparent" finishes, particularly when finely divided metallic powders, such as aluminum powder, are incorporated therein. In the past, transparent finishes have been obtained through the use of organic dyes but the durability and color stability of such finishes, particularly when exposed outdoors, is relatively very poor, rendering them useless for the finishing of automobiles. Important progress, however, has been made in producing transparency with certain colors including greens, blues and maroons through the use of the process described in U. S. Patent 2,140,745, although this method did not provide the desired high transparency in brown and black finishes with pigments heretofore available for producing these colors. Until the present invention, therefore, no means has been available for producing durable "transparent" brown and black finishes and modifications of these colors.

This invention, therefore, has as a primary object the provision of brown and black finishes of striking appearance not obtainable by any means heretofore known. Another object is the provision of new pigment materials which may be satisfactorily employed in cellulose derivative coating compositions. Another object is the provision of brown and black finishes which are quite transparent. A further object is the provision of a coating composition in which metallic powders, such as aluminum, may be incorporated to provide a finish of pleasing transparent metallic apppearance of unusual brilliancy. A further object is the provision of a transparent finish which has satisfactory durability and color stability. A still further object is the provision of a brown transparent finish containing aluminum powder which presents an appearance resembling that of gold or bronze powder coatings. Other objects will appear hereinafter.

These objects are accomplished through the use, in cellulose derivative vehicles, preferably a cellulose nitrate vehicle, of a pigment consisting of hydrous iron oxide, and for best results, incorporated in said vehicle direct from the pulp state, preferably by means of a "flushing" process. The process of U. S. Patent 2,140,745 has been found to be particularly useful for this purpose.

Heretofore, as far as I am aware, the new pigment materials have not been employed as pigments in coating compositions. In order to secure the greatest improvement in color and transparent effects, it is also essential that the new pigment be transferred to the cellulose derivative vehicle direct from the pulp state, preferably by means of a flushing process such as described in U. S. Patent 2,140,745, avoiding the customary steps of drying and in some cases sintering the pigment prior to its incorporation in the coating composition by conventional dispersion methods.

The hydrous ferric oxide used in Examples 1 and 2 was prepared by heating 295 grams of $FeCl_3.6H_2O$ with 100 grams of $Na_2SO_4$ at 70° F. in 10 liters of water and adding slowly during a 15 minute cycle and with constant agitation 240 grams of $Na_2CO_3$ dissolved in 5 liters of water to a final pH of 7.2. Agitation was continued for 15 minutes after which the precipitated hydrous ferric oxide was washed with about 10 liters of water until substantially sulfate free.

The following examples are given by way of illustration only and no limitations are intended thereby except as indicated in the appended claims:

Example 1

| | Per cent by weight |
|---|---|
| 1st portion: | |
| Cellulose nitrate[1] (water wet—23.6% water) | 12.3 |
| Hydrous ferric oxide pulp (70.7% water) | 4.0 |
| Blown castor oil | 3.3 |
| Dibutyl phthalate | 3.0 |
| Ferric hydroxide pulp (70.7% water) | 3.0 |
| Dibutyl phthalate | 1.8 |
| 2nd portion: | |
| Cellulose nitrate[1] | 3.7 |
| Ethyl alcohol (denatured) | 20.1 |
| Butyl acetate | 33.5 |
| Butyl alcohol | 6.2 |
| Resin solution | 9.1 |
| | 100.0 |

[1] The viscosity characteristic of the cellulose nitrate used in this example is about 3 seconds as determined in accordance with the procedure outlined in A. S. T. M. Specifications D–301–33, Formula C.

The resin solution employed in this composition consisted of 30 parts of toluene and 70 parts of a synthetic resin of approximately the following composition:

| | Per cent by weight |
|---|---|
| Glyceryl phthalate | 60 |
| Coconut oil | 15 |
| Dibutyl phthalate | 25 |
| | 100 |

This resin may be conveniently prepared according to the procedure described in U. S. Patent 2,214,127.

The composition was prepared by the process described in U. S. Patent 2,140,745. In preparing the pigmented intermediate represented by the first portion, the cellulose nitrate and the aqueous pigment pulp consisting of a water slurry of the hydrous ferric oxide in its original precipitated form and in the pigment-water proportions indicated, were charged into a kneading machine and mixed for about 5 minutes, after which blown castor oil in the amount shown was added and kneading continued for 30 minutes. During this cycle the temperature of the charge was maintained between 50° and 60° C.

The dibutyl phthalate was added and kneading continued until water separated. This occurred almost immediately. The separated water was decanted and the additional pigment pulp and dibutyl phthalate then charged into the kneading machine. Water again separated and was decanted. Kneading of the mass was continued for 30 minutes at a temperature of about 60° C. Residual water was removed by vacuum in accordance with the procedure of the above patent.

The resulting pigmented intermediate was combined with the ingredients of the second portion in an agitator mixer to produce a transparent brown enamel of unusually pleasing appearance when applied to a suitably prepared metal surface.

The unusual transparency of the finish prepared from this composition is particularly noteworthy. Actual measurment with the Pfund Black and White Cryptometer described in Proc. A. S. T. M. 30, part II, page 880 (1930) showed the composition to have a hiding power of but 30 to 35 square feet per gallon.

When the new pigment was dried for 3 hours at 149° C. to constant weight, re-slurried with water to the same concentration as the pigment pulp employed in Example 1 and then dispersed in the same manner and at the same final pigment content as Example 1, the hiding power determination gave a result of 85 square feet per gallon. The resulting color was also not as good. This clearly illustrates the necessity of transferring the pulp pigment direct to the vehicle base without an intermediate drying step if the highest degree of transparency is to be obtained. In all cases, the hydrous ferric oxide pigment should be maintained in such state as to not exceed a hiding power of 120 square feet per gallon at 7% pigment concentration in the cellulose derivative vehicle and for best results the pigment should be maintained in such small particle size so that the hiding power will not exceed about 50 square feet per gallon at the aforementioned concentration. A hiding power determination of similar enamel of like pigment concentration using a commercial ferrite yellow pigment dispersed by conventional ball mill method gave 250-300 square feet per gallon, a distinction which at once sets it apart from the pigments employed in the present invention in that it would have no utility for the purposes of the present invention.

Particle size measurements also serve to more precisely distinguish the new pigments. Such measurements made through the agency of an ultra-centrifuge show a mean diameter of the pigment used in Example 1 to be but 30.8 millimicrons and characterized by great uniformity; that of the same pigment dried and dispersed in a similar vehicle as described above to be 68 millimicrons and the commercial ferrite yellow 300 millimicrons; or about ten times the average particle size of the hydrous iron oxide pigment. In order to obtain the highest degree of transparency and desired color a hydrous ferric oxide pigment of particle size less than 50 millimicrons in diameter is preferred and in any event, the particle size should not exceed about 100 millimicrons.

*Example 2*

Brilliant and strikingly beautiful metallic finishes may be obtained by incorporating suitable amounts of finely divided aluminum powder in enamels containing the new pigments. The aluminum powder may be added direct in the form of a paste, an intermediate product now commercially available, for example, Alcoa Albron Paste #1580, consisting of approximately 66.5% of aluminum powder and 33.5% of mineral spirits and manufactured by the Aluminum Company of America or, for greater convenience, the paste may first be incorporated in a clear cellulose nitrate base solution and this product then added to the enamel containing the hydrous iron oxide. A suitable intermediate of the latter type consists of:

| | Per cent by weight |
|---|---|
| 1st portion: | |
| Aluminum paste (66.5% aluminum powder) | 7.5 |
| Butyl acetate | 4.0 |
| 2nd portion: | |
| Butyl acetate | 3.5 |
| 3rd position: | |
| Cellulose nitrate | 16.0 |
| Ethyl alcohol (denatured) | 7.4 |
| Methyl ethyl ketone | 7.6 |
| Butyl acetate | 18.6 |
| Butyl alcohol | 9.0 |
| Petroleum naphtha (B. R. 95–135° C.) | 9.0 |
| Blown castor oil | 3.2 |
| Dibutyl phthalate | 4.8 |
| Synthetic resin solution | 9.1 |
| Malic acid | 0.3 |
| | 100.0 |

The viscosity characteristic of the cellulose nitrate used in this composition is about 3 seconds as determined in accordance with the procedure outlined in A. S. T. M. Specifications D–301–33, Formula C.

The resin solution used in this composition was the same type as that shown in Example 1.

The composition is best prepared by mixing the First portion in an agitator mixer for 2 hours followed by the addition of the Second portion with further mixing of one hour and finally the addition of the ingredients of the Third portion with a final 2-hour mixing cycle.

In preparing a suitable metallic enamel containing hydrous iron oxide, the above described aluminum tinting solution may be added with agitator mixing to a composition such as Example 1 in the proportion of 90% by weight of Example 1 composition to 10% by weight of the aluminum tinting solution. The resulting composition when sprayed on a metal surface previously coated with a conventional primer and surfacer gave a finish of unusual brilliancy and of golden bronze appearance. For most purposes, the aluminum tinting solution may be added in the proportion of between 0.5 and 20 parts by weight of aluminum tinting solution to from 99.5 to 80 parts by weight of the pigmented enamel.

Example 3

|  | Per cent by weight |
|---|---|
| 1st portion: | |
| Cellulose nitrate (water wet—22.9% water) | 15.2 |
| Hydrous ferric-ferrous oxide (74.4% water) | 4.0 |
| Blown castor oil | 3.3 |
| Dibutyl phthalate | 3.0 |
| Hydrous ferric-ferrous oxide (74.4% water) | 3.0 |
| Dibutyl phthalate | 1.8 |
| 2nd portion: | |
| Cellulose nitrate | .7 |
| Denatured ethyl alcohol | .1 |
| Butyl acetate | 33.5 |
| Denatured ethyl alcohol | 20.1 |
| Butyl alcohol | 6.2 |
| Resin solution | 9.1 |
| | 100.0 |

The pigment used in this example was prepared according to the following procedure:

220 grams of sodium hydroxide (100%) were dissolved in 4 liters of water at 70° F. A solution of 278 grams of ferrous sulfate ($FeSO_4.7H_2O$) and 270 grams of ferric chloride ($FeCl_3.6H_2O$) in 6 liters of water at 70° F. were added slowly to the sodium hydroxide solution during a 15 minute period. The resulting precipitate was stirred for 25 minutes, filtered and washed sulfate free.

This precipitate is a hydrous iron oxide containing iron in both the ferric and ferrous state corresponding approximately to the formula $Fe_2O_3.2FeO$ plus combned water.

The cellulose nitrate and resin solution in this example were the same type as that described in Example 1. The preparation of the composition also followed the procedure of Example 1. The composition afforded a unique transparent durable black finish not heretofore obtainable with conventional black pigments of durable character. When modified with aluminum powder as in Example 2, a very pleasing metallic finish is obtained that cannot be duplicated by conventional practice.

Examination of the composition of Example 3 by means of an ultra-centrifuge indicated that the average particle size diameter of the black pigment was also about 30 millimicrons. The average particle size of a commercial black iron oxide dispersed in a similar vehicle by conventional ball mill grinding was about 500 millimicrons.

As previously pointed out, the hydrous iron oxides employed as pigments in the present invention, as far as is known, have not been suggested for such purpose. Rather the material has merely constituted an intermediate product in the preparation of ferric oxide and has had no apparent utility as a pigment per se until the present discovery of the unusual and pleasing effects secured through its use as a coloring material. The new pigments are not to be confused with the commercial ferrite yellow pigments which are available as dry pigments and consist of the mono hydrate of ferric oxide, $Fe_2O_3.H_2O$, since these pigments are relatively quite opaque and cannot be treated in any known manner to afford the new results obtained in the present invention.

However, in order to obtain the results described, it is also necessary to avoid the conventional drying, dry grinding and subsequent dispersion in the desired vehicle since if handled in this manner, the new effects are utterly destroyed. Thus, it has been found necessary to transfer the pigment direct from the water slurry after precipitation, to the coating vehicle, omitting the customary drying step. This can be accomplished by "flushing" methods, preferably in accordance with the procedure described in U. S. Patent 2,140,745 when the coating vehicle consists essentially of a cellulose derivative or it may be performed by the simple expedient of mixing the pigment pulp and at least part of the coating vehicle and removing the water by moderate heating, preferably aided by the use of reduced pressures, applied during the mixing cycle. In any event, the transfer of the hydrous iron oxide into the coating vehicle from the slurry should preferably be effected without the intermediate step of drying of the material particularly at elevated temperatures, that is, substantially in excess of 150° C. as provided in prior practice.

The new pigment may be employed with other cellulose derivatives including cellulose acetate, mixed esters such as cellulose acetobutyrate and cellulose acetopropionate and cellulose ethers, for example, ethyl cellulose. In the embodiment of the invention in which the pigments above disclosed are incorporated in a cellulose derivative vehicle, there appears to be a unique combination of elements which produce a strikingly transparent, glossy finish. This cooperation between the method of combining the new pigments and the cellulose derivative vehicle and the result produced is different from that obtained using other organic vehicles.

For most purposes, it is preferred to use the hydrous iron oxide in coating compositions in amounts between about 2% and 10% by weight of the total composition depending mainly upon the particular color and to a lesser degree on the transparency desired.

Tinting solutions based on other coloring matter may be mixed with enamels containing the hydrous iron oxide to provide desired color effects but, in general, if the transparent appearance is to be preserved, this added coloring matter should also be substantially transparent, or if opaque in nature, the amount added should be kept at a minimum.

A particularly striking and brilliant finish may be obtained by incorporating a small amount of aluminum powder in the hydrous iron oxide containing enamel as shown in Example 2. This modification affords a result not obtainable by any other known method for producing metallic finishes.

A further modification that comprehends desirable variation in color while retaining transparency, involves the co-precipitation with the hydrous iron oxide of small quantities of other hydrous metal oxides including the hydrous oxides of manganese, aluminum, cobalt, chromium and copper.

Compositions containing the hydrous iron oxides of the present invention are generally useful for coating purposes where transparency coupled with cleanness and depth of color is a requisite. The finishing of automobiles with the new compositions represents an important utility. Particularly effective results for this purpose are obtained when small amounts of aluminum powder are also added to the composition containing the hydrous iron oxide. The modification consisting of the addition of suitable amounts of finely divided aluminum powder is also useful for coating paper to provide a metallic finish of great brilliancy and beauty resembling in appearance in the case of the hydrous ferric oxide, a finish previously secured only through the use of gold or bronze powder. This type of finish may also be employed as a substitute for gold leaf lettering and similar decorative purposes where this type of appearance is required.

The principal advantage in the new compositions resides in the strikingly beautiful transparent appearance that immediately sets it apart from finishes produced from pigments of these colors heretofore employed. Finishes produced from the enamels are outstanding in color and luster retention showing practically no change in these important properties even after extended outdoor exposure. The requirement that the pigment be transferred to the coating vehicle direct from the pulp state offers important operating economies since certain steps such as drying, dry grinding and then dispersing in the required vehicle usually by further grinding to reduce agglomerates formed in the original dry grinding operation are eliminated. Metallic powders such as aluminum powder may be incorporated with the hydrous ferric oxide pigment without difficulty to provide a brilliancy not heretofore obtainable in brown or black colors. The resulting effect with the hydrous ferric oxide of the present invention is surprisingly similar to that previously secured only through the use of gold or bronze powders.

As many widely different variations may be made in the invention without departing from the spirit and scope thereof, it is to be understood that the invention is not limited to the specific embodiments herein set forth except as defined in the appended claims.

I claim:

1. Coating composition comprising an organic film-forming vehicle containing a cellulose derivative selected from the group consisting of cellulose esters and cellulose ethers and as a pigment hydrous iron oxide characterized by an average particle size diameter of less than 100 millimicrons.

2. Composition of claim 1 in which the average particle size diameter is less than 50 millimicrons.

3. Composition of claim 1 in which the average particle size is about 30 millimicrons.

4. Composition of claim 1 in which the hydrous iron oxide is present in an amount between 2% and 10% by weight of the total composition.

5. Composition of claim 1 in which the hydrous iron oxide is present in an amount of about 7% by weight of the total composition.

6. Coating composition comprising an organic film-forming vehicle containing cellulose nitrate and as a pigment hydrous ferric oxide characterized by an average particle size diameter of less than 100 millimicrons and a hiding power of less than 120 square feet per gallon at 7% by weight pigment concentration in said vehicle.

7. Coating composition comprising an organic film-forming vehicle containing cellulose nitrate and as a pigment hydrous ferric oxide characterized by an average particle size diameter of about 30 millimicrons and a hiding power of about 30 square feet per gallon at 7% by weight pigment concentration in said vehicle.

ROBERT TYLER HUCKS.